Sheet. 1. 4. sheets.

L. J, W. S & C. H. McCormick.

Mower.

No 1256 Reissued Jan. 7, 1862.

Witnesses.

Thos. H. Dodge.

John P. Jacoby.

Inventor.

C. H. McCormick

Sheet 2. 4. Sheets.

L. J. W. S & C. H. McCormick.

Mower.

No 1256 Reissued Jan. 7, 1862.

Witnesses.
Thos. H. Dodge.
John P. Jacobs.

Inventor.
C. H. McCormick.

Sheet 3. 4 Sheets.

L. J. W. S & C. H. McCormick.

Mower.

No 1256 Reissued Jan. 7, 1862.

Witnesses.
Thos. H. Dodge.
John P. Jacob.

Inventor.
C. H. McCormick.

Sheet. 4. 4. Sheets.

L. J. W. S & C. H. McCormick.

Mower.

No. 1256 Reissued Jan. 7, 1862.

Witnesses
Thos. H. Dodge
John P. Jacobs

Inventor.
C. H. McCormick.

UNITED STATES PATENT OFFICE.

C. H. McCORMICK, OF CHICAGO, ILLINOIS, ASSIGNEE OF L. J. McCORMICK, WILLIAM S. McCORMICK, AND CYRUS H. McCORMICK.

IMPROVEMENT IN REAPING AND MOWING MACHINES.

Specification forming part of Letters Patent No. 20,212, dated May 11, 1858; Reissue No. 973, dated June 5, 1860; Reissue No. 1,256, dated January 7, 1862.

*To all whom it may concern:*

Be it known that LEANDER J. McCORMICK, WILLIAM S. McCORMICK, and CYRUS H. McCORMICK, all of Chicago, in the county of Cook and State of Illinois, did invent certain new and useful Improvements in Reaping and Mowing Machines, of which the following is a full, clear, and exact description, reference being had to the accompanying drawings, making part of this specification, in which—

Figure 1:
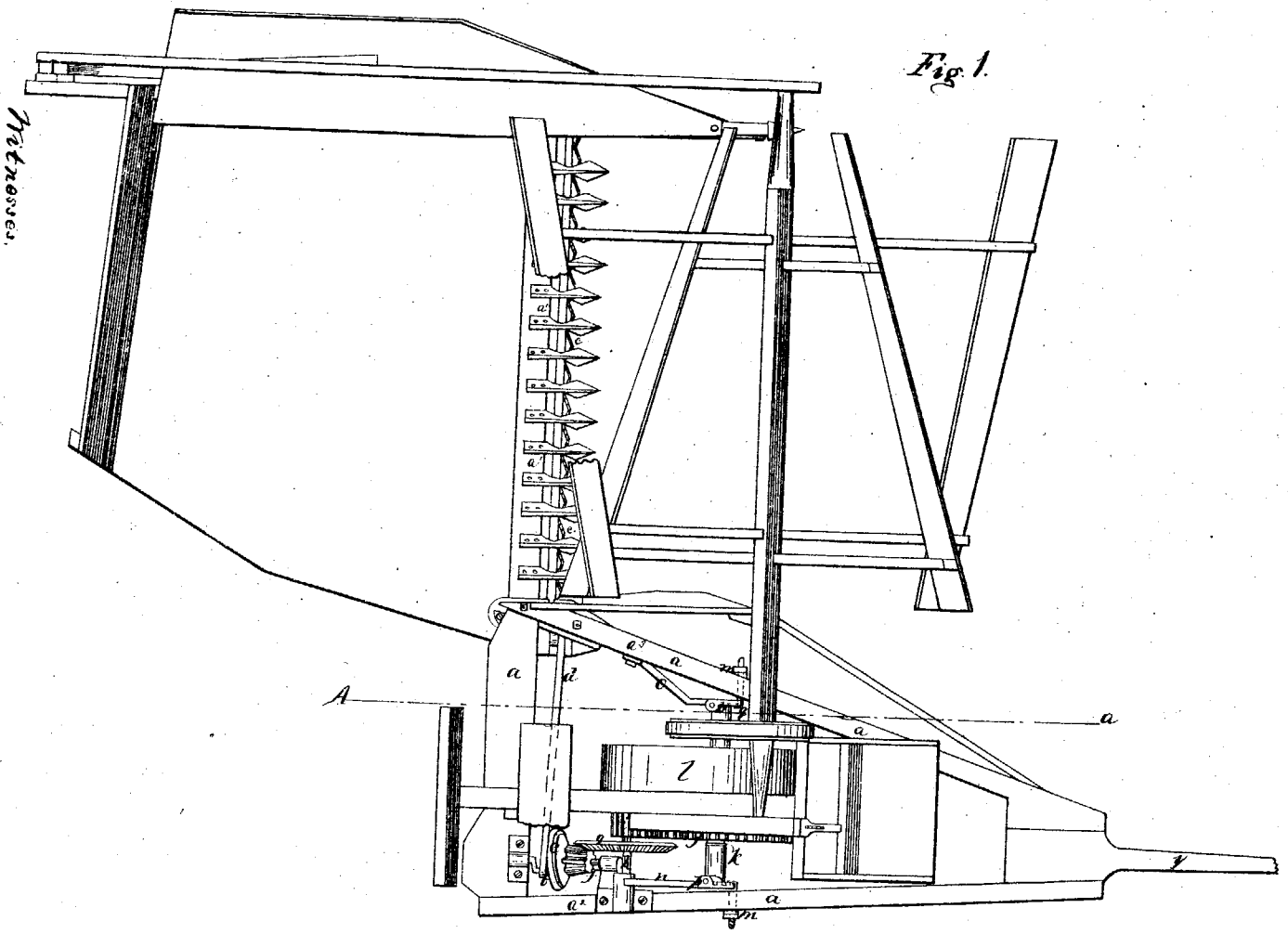
Figure 2:
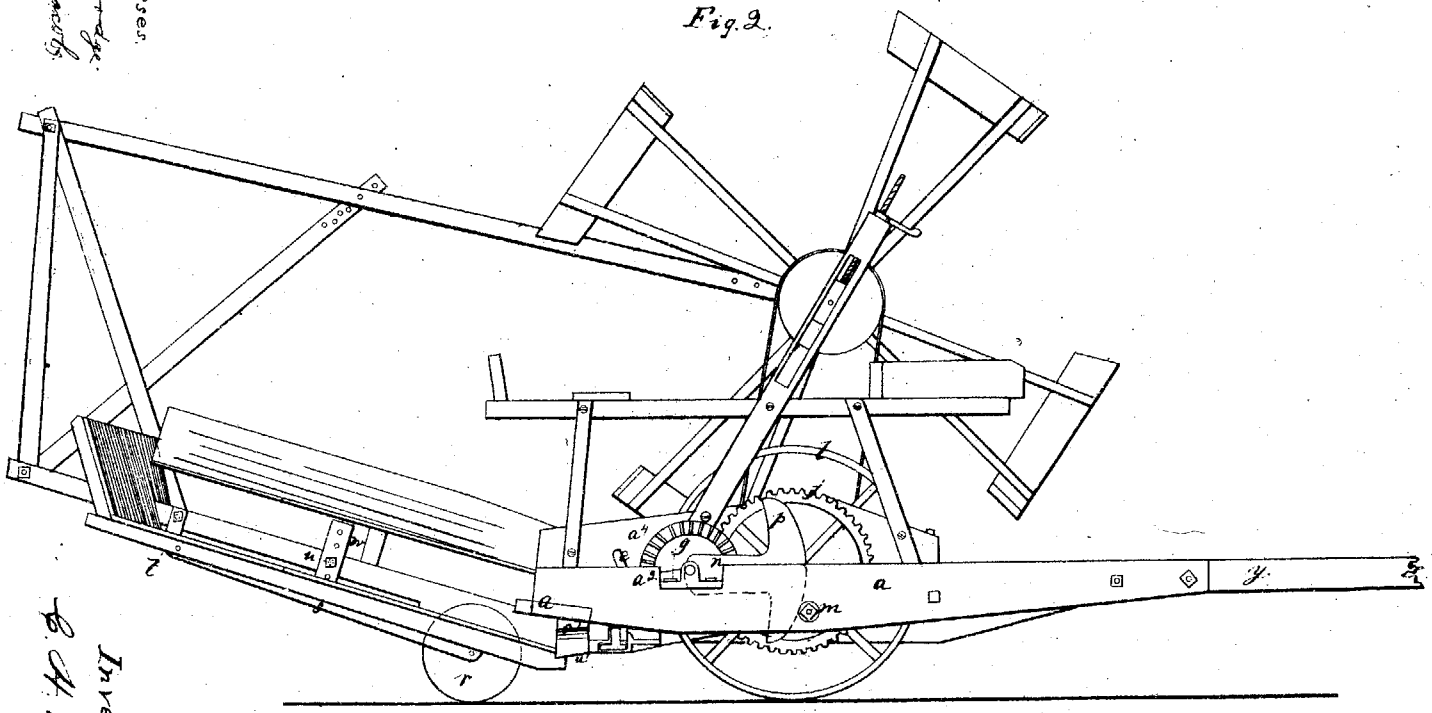
Figure 3:
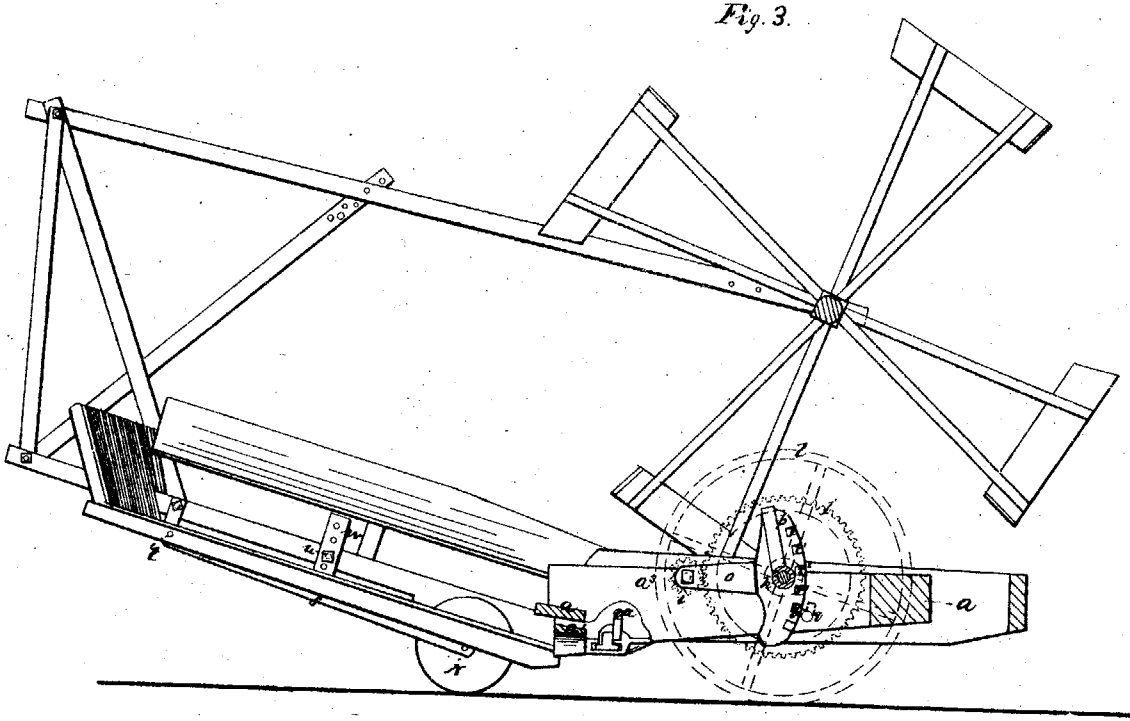
Figure 4:
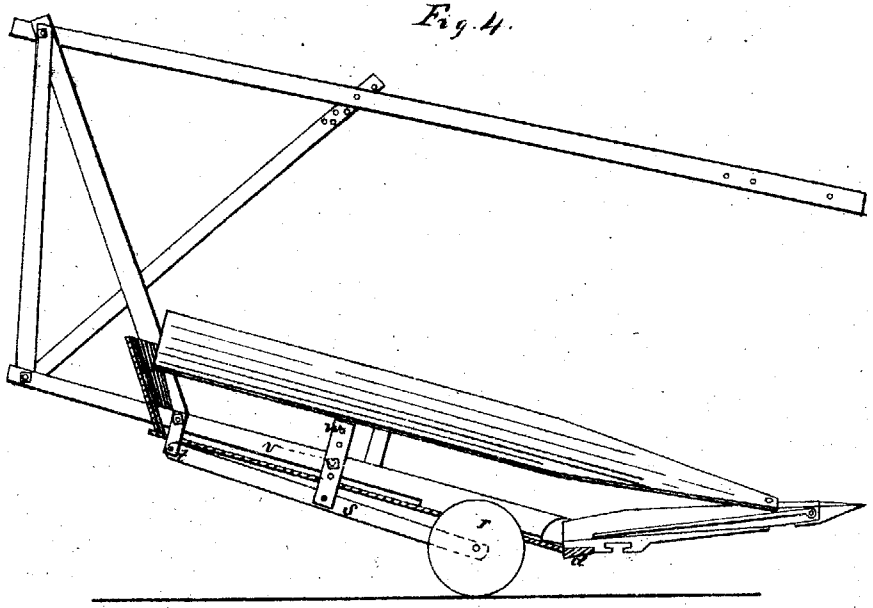

Figure 1 represents a plan of a McCormick reaping and mowing machine embracing said improvements. Fig. 2 represents a side elevation of the machine, and Fig. 3 represents a vertical section taken at the line A *a* of Fig. 1. Fig. 4 represents a section showing more fully the position of the small adjustable wheel *r*, with its frame.

It is important that reaping and mowing machines should be so constructed that their cutting apparatus may be shifted and set at various heights from the surface of the ground, and that this may readily be done and still have their gearing to operate equally well at whatever height the cutter may be set.

The improvement which is the subject of this patent consists in the combination of the frame of the machine, having the cutting apparatus arranged to project from one of its sides, with adjustable segmental or widened arms, or their equivalent, provided with notches or holes (for corresponding bolts or their equivalent) for adjustment, so connected at one end with the axle or journal of the driving-wheel, and at the other end with the frame of the machine, as to provide for shifting the frame and cutting apparatus and holding them at various heights above the ground with a wide range of adjustment without changing the engagement of the gearing of the machine.

In the accompanying drawings, which represent a McCormick reaping and mowing machine with the said improvements adapted thereto, the finger-beam *a'* and the draft pole or tongue *y* are placed at right angles, or thereabout, with each other and connected by a strong frame, *a a a*, which is best made of a triangular form. This frame strengthens the connection of the draft-pole and the finger-beam, so as to insure a firm support for the cutting apparatus against the horizontal strains to which it is liable.

The gearing of said machine is arranged within the frame of the machine, *a a a*. *b* is a crank-shaft, which communicates motion to the vibrating sickle *c* by a connecting-rod, *d*. This crank-shaft carries a fly-wheel, *e*, and a bevel-pinion, *f*, which receives motion from a bevel-wheel, *g*, on a shaft, *h*, which carries a pinion, *i*, receiving motion from the master cog-wheel *j* on the axle *k* of the driving and bearing wheel *l*. One journal of the shaft *h* runs in a box attached to the outside hound, $a^2$, and the other in a box attached to the central board or beam, $a^4$, of the frame.

The axle *k* of the driving and master wheels is mounted in the forward end of two arms or plates, *n o*. The arm *n* has its rear end fitted to turn on that box of the shaft *h* which is secured to the outside hound, and the other arm, *o*, is fitted to turn on a wrist-pin attached to the inside hound, $a^3$, and these two arms must be so mounted that they will turn or vibrate on the line of the axis of the shaft *h*, that carries the pinion *i*, that engages with and receives motion from the master-wheel *j*, so that this pinion and the master-wheel will continue in gear notwithstanding the forward ends of the arms may be elevated or depressed relatively to the frame.

The arms, at their forward ends, are formed in segments or sectors *p p*, the inner faces of which, along the forward edge, are notched at given and equal distances apart to receive the heads of two screw-bolts, *q q*, (one for each sector,) that pass through holes in the hounds, the bolts being secured outside by screw-nuts *m*. By this means it will be seen that by loosening nuts *m* of the screw-bolts for adjustment the sector-arms carrying the driving and master wheels can be depressed or elevated, thus depressing or elevating the frame of the machine with one end of the cutting apparatus and holding it at any desired elevation from the surface of the ground. The other end of the finger-bar and cutting apparatus can be elevated or depressed in a corresponding degree by having the guide-wheel *r* mounted in the forward end of a frame, *s*, the rear end of which turns on a fulcrum-pin, *t*. This frame is secured in any position desired to suit the required elevation by a screw-bolt, *u*, inserted in a series of holes in a standard, *w*, attached to and extending upward from the frame *s*, the holes in the standard being at different elevations to admit of the required adjustment.

Having shown one practical and good way to apply said improvements to use, it is manifest that they may be arranged to apply to other reaping and mowing machines.

What is claimed under this patent as the invention of the said LEANDER J., WILLIAM S., and CYRUS H. MCCORMICK is—

1. The combination of the segmental arms or their equivalent, having notches or holes for adjustment with the frame of the machine, and adjusting-bolt or its equivalent, so as to raise and lower the frame and cutting apparatus and hold them in any desired position, substantially as set forth.

2. Holding the segmental arms or their equivalent to the frame of the machine by means of the hooked head of the bolt or detent in the notches of the sectors, substantially as shown and described.

In testimony whereof I have hereunto subscribed my name.

C. H. MCCORMICK.

Witnesses:
THOMAS H. DODGE,
JOHN P. JACOBS.